(12) United States Patent
Kühne et al.

(10) Patent No.: US 8,651,521 B2
(45) Date of Patent: Feb. 18, 2014

(54) AIRBAG MODULE HAVING AN AIRBAG WITH AN ADAPTIVE VENTILATION OPENING

(75) Inventors: Klaus-Peter Kühne, Karlsfeld (DE); Karl-Heniz Sommer, Stockdorf (DE); Marc Schock, Karlsfeld (DE); Marcus Weber, Untertheres (DE); Jörg Albert, Germering (DE)

(73) Assignee: Autoliv Development AB, Vårgårda (SE)

( * ) Notice: Subject to any disclaimer, the term of this patent is extended or adjusted under 35 U.S.C. 154(b) by 100 days.

(21) Appl. No.: 13/264,270

(22) PCT Filed: Apr. 9, 2010

(86) PCT No.: PCT/EP2010/002210
§ 371 (c)(1),
(2), (4) Date: Oct. 13, 2011

(87) PCT Pub. No.: WO2010/121717
PCT Pub. Date: Oct. 28, 2010

(65) Prior Publication Data
US 2012/0038138 A1   Feb. 16, 2012

(30) Foreign Application Priority Data

Apr. 21, 2009 (DE) .......................... 10 2009 018 159

(51) Int. Cl.
*B60R 21/239* (2006.01)
*B60R 21/2338* (2011.01)
*B60R 21/2342* (2011.01)

(52) U.S. Cl.
CPC ........... *B60R 21/239* (2013.01); *B60R 21/2338* (2013.01); *B60R 21/2342* (2013.01); *B60R 2021/2395* (2013.01); *B60R 2021/23388* (2013.01)

USPC ......................................... 280/739; 280/743.2

(58) Field of Classification Search
CPC ........... B60R 21/2342; B60R 21/2338; B60R 21/239; B60R 2021/23388; B60R 2021/2395
USPC ............................ 280/739, 740, 743.1, 743.2
See application file for complete search history.

(56) References Cited

U.S. PATENT DOCUMENTS 4,805,930 A * 2/1989 Takada ........................ 280/739
5,016,913 A   5/1991 Nakajima et al.
(Continued)

FOREIGN PATENT DOCUMENTS

DE   196 40 322        3/1996
DE   195 17 315 C2   11/1996
(Continued)

OTHER PUBLICATIONS

International Search Report—Jun. 1, 2010.

*Primary Examiner* — Nicole Verley
*Assistant Examiner* — George Spisich
(74) *Attorney, Agent, or Firm* — Brinks Gilson & Lione

(57) ABSTRACT

An airbag module for installation in a motor vehicle has an airbag made of an airbag fabric and folded up before being triggered by an inflation device. The airbag fabric has at least one slit forming an adaptive ventilation opening and a retaining strap, which at one end is held releasably on a retainer on the airbag module and at the other end is connected fixedly to the airbag. The slit (11) is cut into the airbag fabric and has two ends configured to prevent the slit (11) from tearing when pressure is applied. The retaining strap is arranged on the inside of the airbag and is guided through a securing loop (17) attached to the airbag fabric opposite the fixed end (14) of the retaining strap across the slit (11) toward the retainer.

8 Claims, 5 Drawing Sheets

(56) References Cited

U.S. PATENT DOCUMENTS

| | | | |
|---|---|---|---|
| 5,172,933 A | 12/1992 | Strasser | |
| 5,246,250 A | 9/1993 | Wolanin et al. | |
| 5,280,953 A | 1/1994 | Wolanin et al. | |
| 5,290,953 A | 3/1994 | Clark, Jr. et al. | |
| 5,306,043 A | 4/1994 | Mihm et al. | |
| 5,350,188 A | 9/1994 | Sato | |
| 5,405,166 A | 4/1995 | Rogerson | |
| 5,421,607 A | 6/1995 | Gordon | |
| 5,492,363 A | 2/1996 | Hartmeyer et al. | |
| 5,494,314 A | 2/1996 | Kriska et al. | |
| 5,603,526 A | 2/1997 | Buchanan | |
| 5,931,497 A | 8/1999 | Fischer | |
| 6,056,318 A | 5/2000 | Braunschadel | |
| 6,095,557 A | 8/2000 | Takimoto et al. | |
| 6,126,196 A | 10/2000 | Zimmerman | |
| 6,139,048 A | 10/2000 | Braunschadel | |
| 6,183,003 B1 | 2/2001 | Matsuhashi et al. | |
| 6,206,408 B1 | 3/2001 | Schneider | |
| 6,247,726 B1 | 6/2001 | Ryan | |
| 6,290,257 B1 | 9/2001 | Bunce et al. | |
| 6,371,509 B1 | 4/2002 | Ellerbrok et al. | |
| 6,398,258 B2 | 6/2002 | Hamada et al. | |
| 6,631,921 B1 | 10/2003 | Drossler et al. | |
| 6,631,922 B2 | 10/2003 | Hess et al. | |
| 6,648,371 B2 | 11/2003 | Vendely et al. | |
| 6,746,045 B2 | 6/2004 | Short et al. | |
| 6,773,027 B2 | 8/2004 | Bohn et al. | |
| 6,773,030 B2 | 8/2004 | Fischer | |
| 6,832,778 B2 | 12/2004 | Pinsenschaum et al. | |
| 6,863,304 B2 | 3/2005 | Reiter et al. | |
| 6,918,613 B2 | 7/2005 | Short et al. | |
| 6,932,385 B2 | 8/2005 | Hawthorn et al. | |
| 6,971,671 B2 | 12/2005 | Schneider et al. | |
| 7,059,634 B2 | 6/2006 | Bossecker et al. | |
| 7,083,191 B2 | 8/2006 | Fischer | |
| 7,083,192 B2 | 8/2006 | Fischer et al. | |
| 7,210,702 B2 | 5/2007 | Soderquist | |
| 7,237,802 B2 | 7/2007 | Rose et al. | |
| 7,261,319 B2 | 8/2007 | DePottey et al. | |
| 7,328,915 B2 | 2/2008 | Smith et al. | |
| 7,347,450 B2 | 3/2008 | Williams et al. | |
| 7,360,789 B2 | 4/2008 | Bito | |
| 7,364,192 B2 | 4/2008 | Braun et al. | |
| 7,584,993 B2 * | 9/2009 | Yamaji et al. | 280/736 |
| 7,614,653 B2 | 11/2009 | Rose et al. | |
| 7,614,654 B2 | 11/2009 | Williams | |
| 7,722,079 B2 * | 5/2010 | Lee et al. | 280/739 |
| 7,722,080 B2 | 5/2010 | Rose et al. | |
| 7,931,299 B2 * | 4/2011 | McFadden et al. | 280/743.2 |
| 8,152,199 B2 * | 4/2012 | Bauer et al. | 280/743.2 |
| 8,262,130 B2 * | 9/2012 | Fischer et al. | 280/743.2 |
| 8,322,748 B2 * | 12/2012 | Abe et al. | 280/739 |
| 2003/0020266 A1 | 1/2003 | Vendely et al. | |
| 2003/0020268 A1 | 1/2003 | Reiter et al. | |
| 2003/0057691 A1 | 3/2003 | Tokita et al. | |
| 2003/0127839 A1 | 7/2003 | Jenkins | |
| 2003/0209895 A1 | 11/2003 | Gu | |
| 2003/0214125 A1 | 11/2003 | Schneider et al. | |
| 2003/0222446 A1 | 12/2003 | Soderquist et al. | |
| 2004/0012179 A1 | 1/2004 | Pinsenschaum et al. | |
| 2004/0017069 A1 * | 1/2004 | Fischer | 280/739 |
| 2004/0056459 A1 | 3/2004 | Kassman et al. | |
| 2004/0090054 A1 | 5/2004 | Bossecker et al. | |
| 2004/0130135 A1 | 7/2004 | Ekdahl | |
| 2004/0188990 A1 | 9/2004 | Short et al. | |
| 2004/0256842 A1 | 12/2004 | Breed et al. | |
| 2005/0052008 A1 | 3/2005 | Rose et al. | |
| 2005/0098990 A1 | 5/2005 | Pinsenschaum et al. | |
| 2005/0236822 A1 | 10/2005 | Rose et al. | |
| 2005/0248137 A1 | 11/2005 | Delventhal et al. | |
| 2006/0071461 A1 | 4/2006 | Williams et al. | |
| 2006/0071462 A1 | 4/2006 | Smith et al. | |
| 2006/0151979 A1 | 7/2006 | DePottey et al. | |
| 2006/0197327 A1 | 9/2006 | Maripudi et al. | |
| 2006/0202454 A1 | 9/2006 | Parizal et al. | |
| 2007/0052222 A1 | 3/2007 | Higuchi et al. | |
| 2007/0108750 A1 | 5/2007 | Bauer et al. | |
| 2007/0126218 A1 | 6/2007 | Schnieder et al. | |
| 2007/0126219 A1 | 6/2007 | Williams | |
| 2007/0132222 A1 | 6/2007 | Thomas et al. | |
| 2007/0145729 A1 * | 6/2007 | Ishiguro et al. | 280/739 |
| 2007/0205590 A1 | 9/2007 | Klinkenberger et al. | |
| 2008/0007038 A1 | 1/2008 | Fischer et al. | |
| 2008/0018086 A1 | 1/2008 | Ford et al. | |
| 2008/0023950 A1 | 1/2008 | Kalczynski et al. | |
| 2008/0023959 A1 | 1/2008 | Crawford | |
| 2008/0042416 A1 | 2/2008 | Razazi et al. | |
| 2008/0073890 A1 | 3/2008 | Williams et al. | |
| 2008/0073891 A1 | 3/2008 | Rose et al. | |
| 2008/0073892 A1 | 3/2008 | Rose et al. | |
| 2008/0073893 A1 | 3/2008 | Schneider | |
| 2008/0079250 A1 | 4/2008 | Boyle et al. | |
| 2008/0303256 A1 | 12/2008 | Williams | |
| 2009/0039630 A1 | 2/2009 | Schneider et al. | |

FOREIGN PATENT DOCUMENTS

| | | |
|---|---|---|
| DE | 10 2009 018 159 A1 | 11/2010 |
| EP | 1 790 538 A2 | 5/2007 |
| JP | 05085295 | 4/1993 |
| JP | 2001-158315 | 6/2001 |
| WO | WO 03/006276 A2 | 1/2003 |
| WO | WO 2010 121717 A1 | 10/2010 |

* cited by examiner

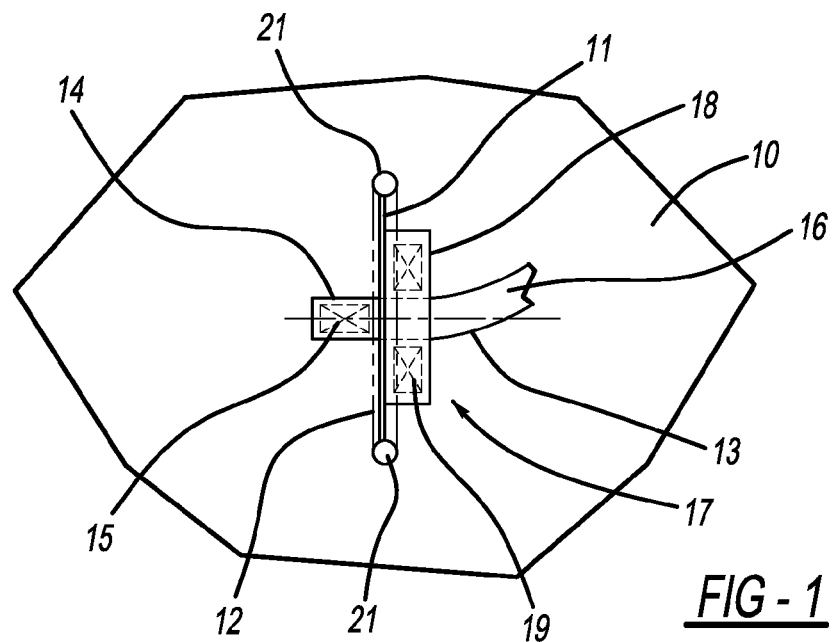
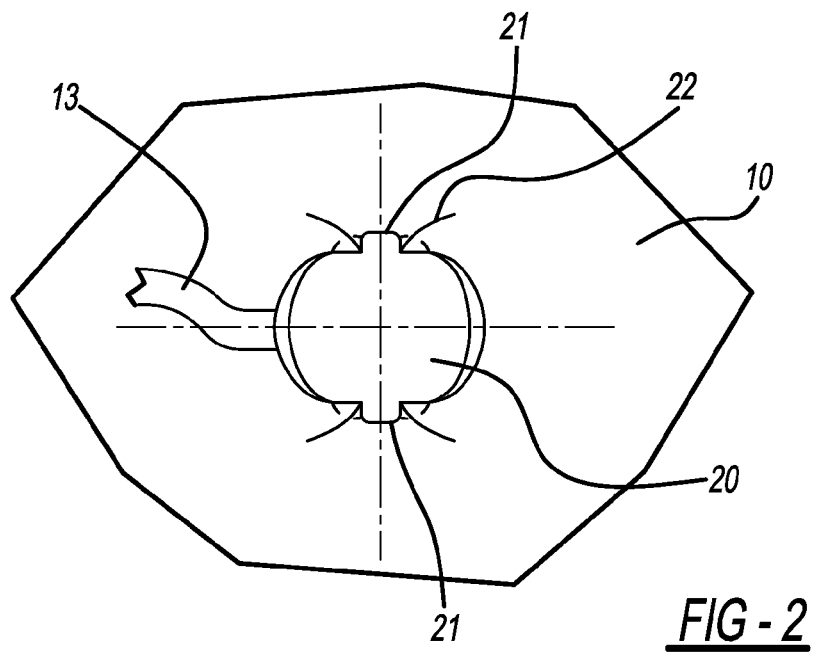

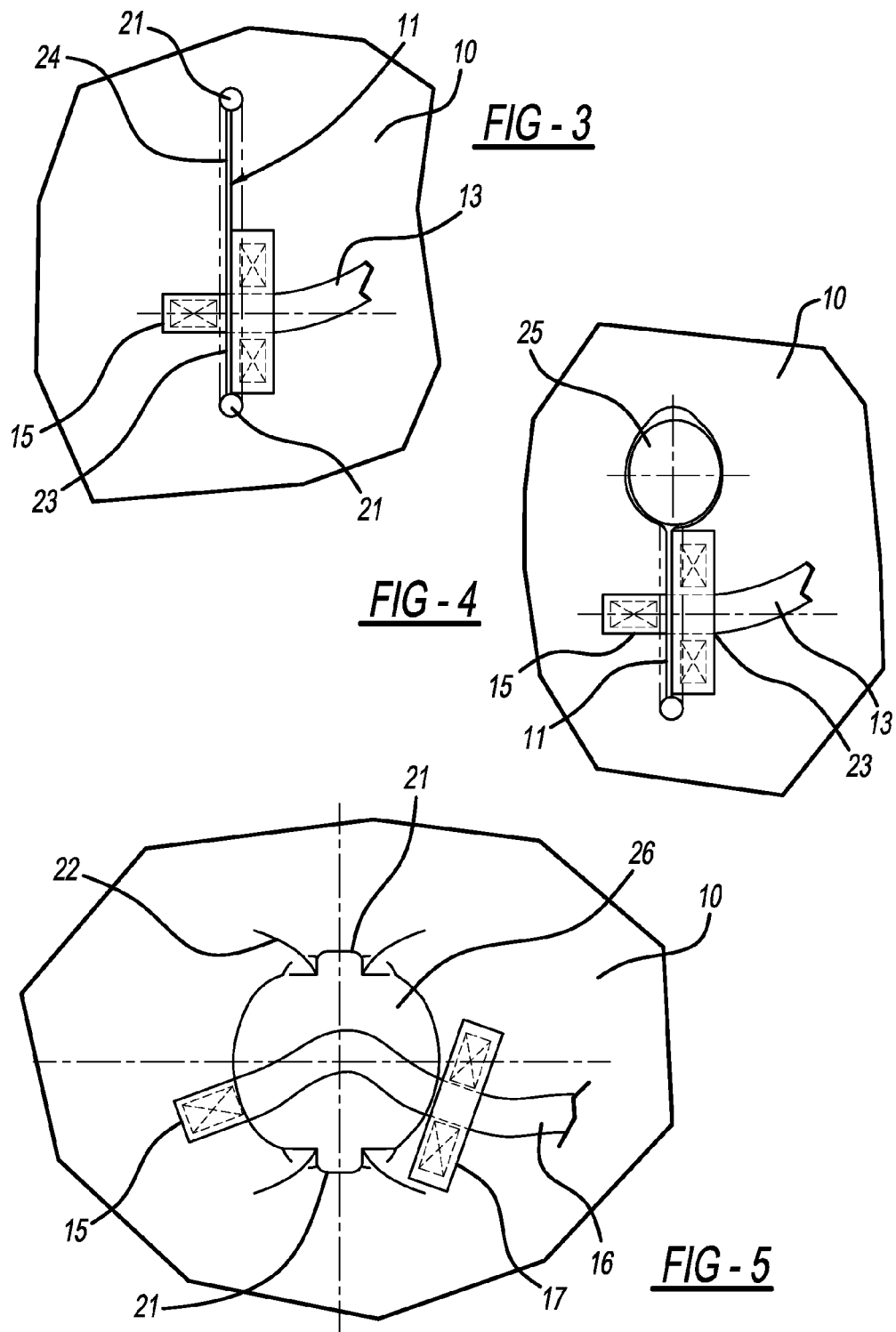

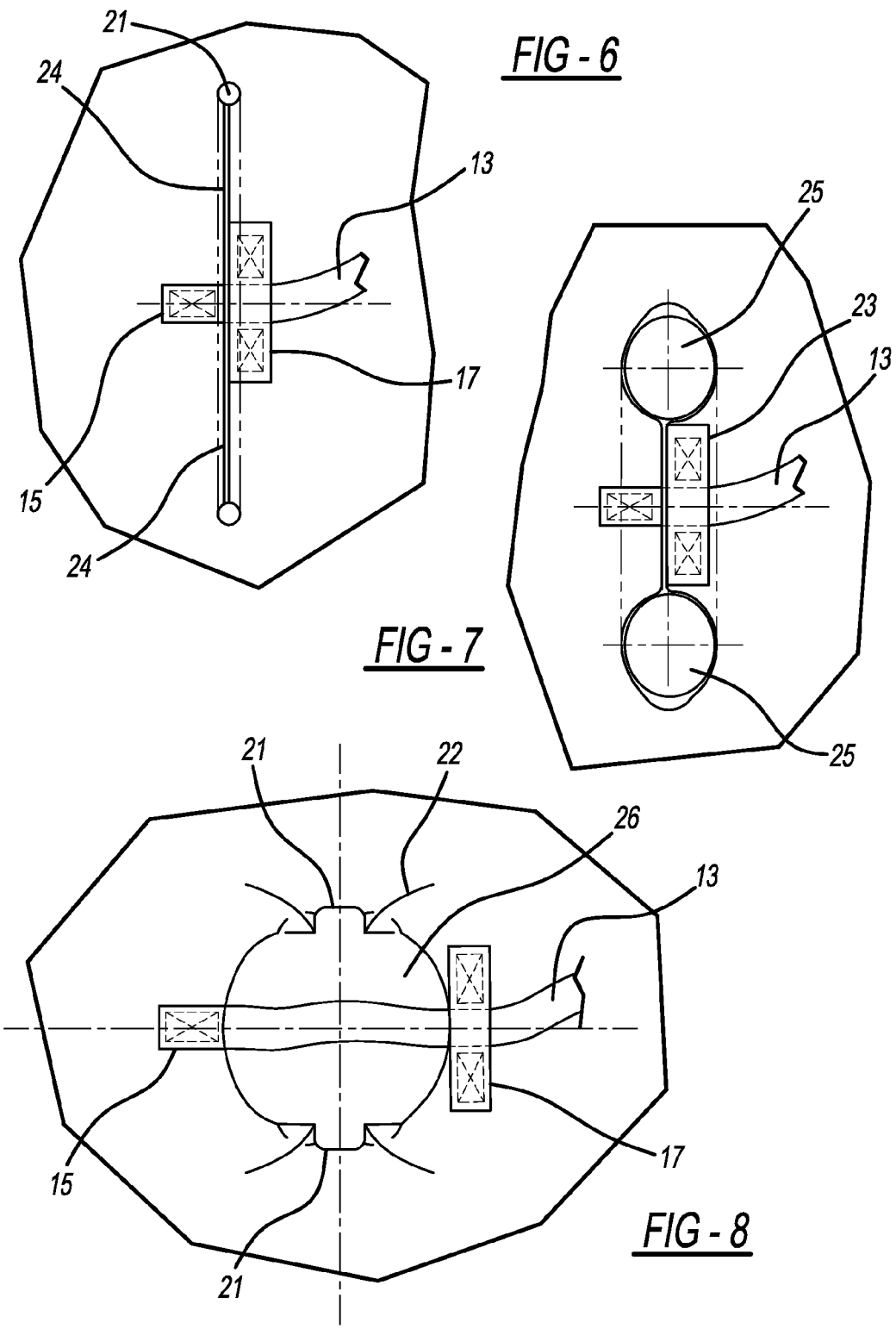

ized position in the same way as a loop which is formed of a separate fabric strip, wherein in this case the loop formed at the end of the belt receives an end of the retaining strap, which is to be attached to the airbag module, and furthermore holds the loop on the retaining strap is provided with two lines of stitches, which are arranged tangentially with respect to the stop hole, it is possible that at the same time in particular when the retaining strap runs at right angles to the slit, tears are also initiated on the airbag fabric on both sides of the retaining strap when the airbag is unfolded.

AIRBAG MODULE HAVING AN AIRBAG WITH AN ADAPTIVE VENTILATION OPENING

CROSS REFERENCE TO RELATED APPLICATIONS

This application claims priority to German Patent Application No. 10 2009 018 159.8, filed Apr. 21, 2009 and PCT/EP2010/002210, filed Apr. 9, 2010.

TECHNICAL FIELD OF THE INVENTION

The invention relates to an airbag module for installation in a motor vehicle, with an airbag which is formed from an airbag fabric and with an inflation device for the airbag, which is folded up before being triggered, wherein the airbag has at least one adaptive ventilation opening which is at least partially kept in a closed state when it is in the folded state before the airbag is inflated, and wherein a retaining strap, which is held releasably on the airbag module or on a part which is fixed to the vehicle at one end and is connected fixedly to the airbag with its other end, which overlaps the adaptive ventilation opening, is provided in such a manner that, when the airbag is inflated, if the releasably held end of the retaining strap is not released, the retaining strap, which is stretched by the inflation pressure, prevents the adaptive ventilation opening from opening.

BACKGROUND OF THE INVENTION

An airbag module with the above-mentioned features is known from WO 03/006276 A2. For keeping the ventilation opening closed before and also during the inflation of the airbag and for only allowing the ventilation opening to be released at a certain time, a type of retaining strap is provided in the known airbag module and fixed with one end to the airbag fabric in the region of the adaptive ventilation opening, which fabric on one hand completely covers the ventilation opening in its starting or mounted position and closes it, and which on the other hand is fixed with its other end to a module-side retaining device in such a manner that the relevant end of the retaining strap is released when the retaining device is triggered. The retaining strap has dimensions such that it completely covers the ventilation opening. The retaining strap is furthermore guided with its free end towards the releasable retaining device in the form of a bolt which can be blasted off and fixed to the bolt with a loop formed at the end. The length of the retaining strap is such that, when the airbag is folded up, the region of the airbag fabric which is overlapped by the retaining strap with the ventilation opening which is arranged therein and sealed off by the retaining strap is held fast and thus cannot assume its stretched position when the airbag is inflated. In addition, tear seams are provided for fixing the retaining strap in its mounted position. The retaining strap releases the fabric region which has the ventilation opening only after the retaining device has been activated and the end of the retaining strap fixed thereon is released, so that the region, which is fixed by the retaining strap, of the airbag completely unfolds and completely opens the adaptive ventilation opening owing to the stretching of the airbag fabric, wherein at the same time the retaining strap is removed from the opening so that the ventilation opening is released.

The known airbag module entails the disadvantage that the arrangement of the retaining strap must be matched to the respective side of the adaptive ventilation opening after dimensioning and fixing; furthermore the assembly of the airbag including of the retaining strap to be attached to it in the airbag is complex.

SUMMARY OF THE INVENTION

The invention is therefore based on the object of designing the closure of the adaptive ventilation opening in a simple and effective manner before it is released in a specifically induced manner, in an airbag module with the features of the type described above.

The basic idea of the invention provides for the adaptive ventilation opening to be formed by a slit cut into the airbag fabric, at both ends of which a formation is arranged which prevents the slit from tearing when pressure is applied, and for the retaining strap which is arranged on the inside of the airbag and overlaps the adaptive ventilation opening to be guided through a securing loop which is attached to the airbag fabric opposite the fixing point of one end of the retaining strap with respect to the slit and then to be further guided towards the retainer on the part which is fixed to the vehicle.

The invention has the advantage that the introduction of the adaptive ventilation opening which is initially closed by the retaining strap can be carried out easily, in that it is only necessary to cut into the airbag fabric and to apply the formations which prevent the slit from tearing when pressure is applied. Advantageously, no particular requirements need to be made of the retaining strap in terms of its dimensions or fastening either. It is sufficient if the retaining strap which is fastened with one end to the airbag extends over the slit-like adaptive ventilation opening and is attached releasably to the airbag module or to a part fixed to the vehicle with its other end, so that the retaining strap prevents a tensile load which acts on the slit from forming and thus prevents the adaptive ventilation opening from opening prematurely when the airbag unfolds. If the retaining strap is released deliberately by means of a correspondingly provided device, the stretching, which is made possible by this, of the fabric regions which are initially coupled to each other by the retaining strap and are situated on both sides of the slit, leads to an opening of the slit and thus to a release of the adaptive ventilation opening. The additionally provided arrangement of the securing loop has the advantage that it is ensured that the retaining strap runs at right angles to the slit, so that the transverse forces or transverse force components occurring otherwise if the retaining strap started to run obliquely to the slit are avoided when the airbag unfolds. This means that the slit-like adaptive ventilation opening is reliably prevented from opening until the retaining strap is released.

According to an exemplary embodiment of the invention it is provided for the securing loop to consist of a fabric strip which is arranged transversely with respect to the direction in which the retaining strap runs and is connected fixedly at its two outer ends to the airbag fabric.

It can be provided in a manner known per se for the retainer which receives the end of the retaining strap to be attached to a part of the airbag module, which part is situated in the interior of the airbag.

In a first configuration of the invention, the formation which prevents the slit from tearing when pressure is applied can consist of a transverse seam which runs transversely with respect to the longitudinal extent of the slit.

It is however expedient and advantageous for the configuration of further embodiments of the invention if the relevant formation consists of a stop hole which is arranged at the end of the slit.

If, in addition to an adaptive ventilation opening, one or a plurality of standard ventilation openings are also configured in a customary airbag, as also described in WO 03/006376 A2, for allowing the gas to flow out even at a pressure load which is below the pressure which is preset for the opening of the adaptive ventilation opening, it is provided in one embodiment of the invention for the adaptive ventilation opening, which is configured according to the invention in the form of the slit, to be combined with at least one additionally provided standard ventilation opening. This is provided according to one exemplary embodiment of the invention in that the slit has such a length that one slit section which is kept closed by the retaining strap until the retaining strap is released, and at least one slit section which opens under the effect of pressure when the airbag inflates and forms a standard ventilation opening are formed. When the airbag inflates, first the slit region which is not held together by the retaining strap opens and thus forms the standard ventilation opening, while the slit region which is initially held together by the retaining strap can only open and thus form the adaptive ventilation opening after the retaining strap has been released. After the slit has been completely released, there is a ventilation opening with a correspondingly sized cross section.

As part of such a configuration of the slit it can be provided according to different exemplary embodiments for the retaining strap to overlap the slit in a central arrangement and for standard ventilation openings to form in each case at both ends of the slit or for the retaining strap to overlap the slit in its one end region and for the standard ventilation opening to form at one end in the other end region.

In an alternative embodiment, it can be provided with regard to the formation of standard ventilation openings for the desired standard ventilation opening or further standard ventilation openings to be configured as openings which are cut into the airbag fabric at the start, for which at least one of the stop holes, which are provided according to an exemplary embodiment of the invention, of the slit can advantageously be used by the relevant stop hole having such large dimensions that this stop hole is itself used as a standard ventilation opening. The stop hole which is configured in the form of the standard ventilation opening thus fulfills a double function.

To this end, it can be provided in different exemplary embodiments of the invention for one of the two stop holes to be configured as a constantly open standard ventilation opening when the airbag is unfolded or for both stop holes to be configured as constantly open standard ventilation openings when the airbag is unfolded.

According to a further exemplary embodiment of the invention, it is also provided for different configurations with regard to an additional standard ventilation opening to be combined, and to this end it can be provided, when the retaining strap which overlaps the slit is arranged centrally, for the stop hole which is formed at one end of the slit to be configured as a constantly open standard ventilation opening when the airbag is unfolded, and for the slit region which forms the other end of the slit to open to form a second standard ventilation opening under the effect of pressure, wherein the slit region which is situated between the ventilation openings under the effect of pressure and is overlapped by the retaining strap is released when the retaining strap is released so that a single ventilation opening with corresponding dimensions is formed thereafter.

For further protection against premature opening of the slit, it can be provided according to an exemplary embodiment of the invention for the slit to be overlapped by a tear seam which includes the fabric regions on both sides of the slit. This also prevents the slit from opening in the regions in which standard ventilation openings are to form, in any case until a corresponding inner pressure or a corresponding pressure load is produced when the airbag is inflated.

Exemplary embodiments of the invention are shown in the drawing and are described below.

BRIEF DESCRIPTION OF THE DRAWINGS

In the figures,

FIG. 1 shows a fabric region, which has an adaptive ventilation opening, of an airbag with a slit introduced therein, in a plan view of the inside of the airbag fabric when the adaptive ventilation opening is closed, FIG. 2 shows the subject matter of FIG. 1 with the adaptive ventilation opening released and open, FIG. 3 shows the subject matter of FIG. 1 with an additional slit region which forms a standard ventilation opening, in a closed state, FIG. 4 shows the subject matter of FIG. 3 with the standard ventilation opening open, but with the adaptive ventilation opening still closed, FIG. 5 shows the subject matter of FIG. 4 with the adaptive ventilation opening also open, FIGS. 6-8 show the subject matter of FIGS. 3 to 5 with slit regions which are arranged on both sides of the adaptive ventilation opening, which is overlapped by the retaining strap, and in each case form a standard ventilation opening.

DETAILED DESCRIPTION OF THE DRAWINGS

Figure 9:
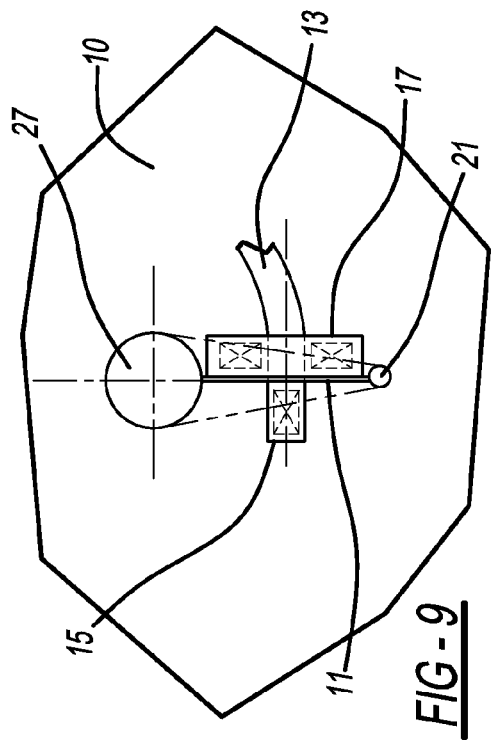
FIG. 9 shows the subject matter of FIG. 1 with a standard ventilation opening which is cut into the airbag fabric instead of a stop hole situated at the end of the slit, with an initially closed adaptive ventilation opening.

FIGS. 1 and 2 first show an exemplary embodiment in which only one adaptive ventilation opening is realized. To this end, a slit 11 is cut into a fabric region 10 of an airbag, which is not shown further but is known in detail from WO 03/06276 A2, and the slit is surrounded by a reinforcing seam 12 which encloses its periphery in the exemplary embodiment shown. It is understood that the slit cut into the fabric widens with increasing pressure inside the airbag and thus a corresponding opening forms. In order to prevent the slit 11 which is cut into the fabric region 10 from tearing when pressure is correspondingly applied, stop holes 21 are made in each case at both ends of the slit 11.

In order to produce an adaptive ventilation opening which is defined by the slit 11, a retaining strap 13 is provided which consists of a fabric strip and is connected fixedly with one end 14 to the fabric region 10 by means of a sewn section 15 which is attached in a region which is directly adjacent to the slit 11. The retaining strap 13 is further guided from this sewn section 15 into a position which overlaps the slit 11 and attached with its free end 16 in a manner which is likewise not shown but also known from WO 03/006276 A2 to a retaining device 28 which is situated on the airbag module, which is likewise not shown and arranged in the interior of the airbag, or to another part which is fixed to the vehicle, in such a manner that the free end 16 of the retaining strap 13 can be released on the basis of corresponding signals.

The securing loop 17, which undertakes a directed guidance of the retaining strap 13 after it has been released, is attached to the fabric region 10 opposite the sewn section 15 with respect to the slit 11 and consists of the fabric strip 18, which is arranged transversely with respect to the direction in which the retaining strap 13 runs, and is connected at its two outer ends to the fabric region 10 by means of secure sewn sections 19. The attachment of the securing loop 17 means that the retaining strap 13 is secured in its position which overlaps the slit 11 in such a manner that it is ensured that the retaining strap 13 runs approximately at right angles to the slit 11 even when the retaining strap 13 is under tensile loading. This means that the occurrence of transverse forces or transverse force components which act on the slit 11 is avoided.

If the free end 16 of the retaining strap 13 is released by the retaining device 28 (not shown in detail), the retaining strap 13 is pulled through the securing loop 17 when the slit 11 is widened by the internal pressure which acts on the airbag fabric and thus does not prevent the slit 11 from opening into the adaptive ventilation opening 20 which is shown in the open state in FIG. 2. If the cohesion of the two fabric regions which are separated by the slit 11 can be improved by a tear seam which overlaps the slit 11 in order to prevent leakages, this tear seam tears open so that its ends 22 can be seen in FIG. 2.

In the exemplary embodiment shown in FIGS. 3 to 5, the application of the adaptive ventilation opening is combined with the application of a standard ventilation opening, as such standard ventilation openings are present in airbags of known configuration. These standard ventilation openings are intended to allow the gas to flow out at a corresponding pressure loading of the inflated airbag. In the exemplary embodiment shown in FIGS. 3 to 5, the slit 11 is divided into two regions 23 and 24. The region 23 is overlapped by the retaining strap 13 and thus held together so that the adaptive ventilation opening can be formed in this slit region 23. The other slit region 24 is kept free so that this slit region 24 opens to form a standard ventilation opening 25 after the airbag inflates with the corresponding effect of pressure, as shown in FIG. 4. In this state the adaptive ventilation opening is initially not yet released. This released state is then reproduced in FIG. 5, in which the retaining strap 13 is released by releasing the retaining device 28 so that a common ventilation opening 26 with a corresponding opening cross section is produced.

The exemplary embodiment shown in FIGS. 6 to 8 differs from the exemplary embodiment described previously in relation to FIGS. 3 to 5 only in that the slit 11 is configured with such a length that two slit regions 24 are provided on both sides of a central slit region 23, which is overlapped by the retaining strap 13 and forms the adaptive ventilation opening, in order to form a double standard ventilation opening 25 so that, after the slit 11 is completely released or opened, a common ventilation opening is in turn produced, as already shown stated in connection with FIG. 5.

Figure 10:
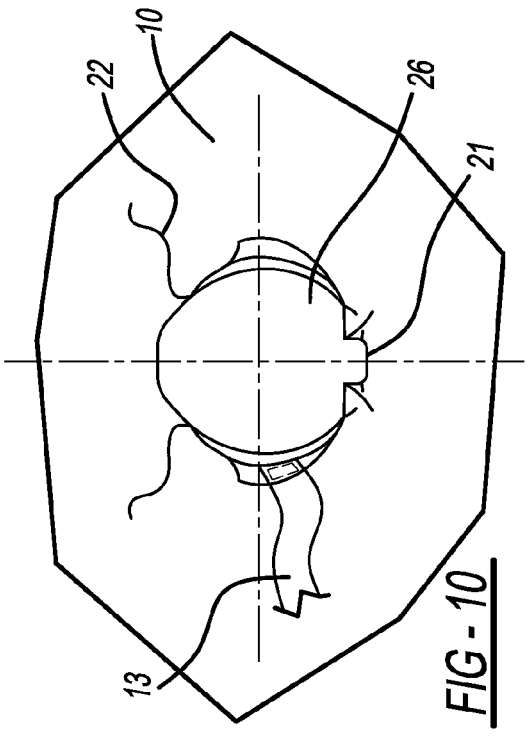
FIG. 10 shows the subject matter of FIG. 9 with the adaptive ventilation opening also open.

In the exemplary embodiment shown in FIGS. 9 and 10, the application of a standard ventilation opening is changed compared to the exemplary embodiments described in connection with FIGS. 3 to 8 in that a slit region for a later widening is not used as a standard ventilation opening, but a standard ventilation opening 27 is formed from the start by cutting a corresponding opening into the airbag fabric. If it is expedient to apply stop holes 21 at the relevant ends of the slit 11, as described in connection with FIG. 1, the standard ventilation opening 27 is then arranged instead of a stop hole 21 so that the standard ventilation opening 27 assumes the function of the stop hole. In this respect, in the exemplary embodiment according to FIGS. 9 and 10, it comes to a release of the slit 11 in the manner described in connection with FIG. 1 with formation of an adaptive ventilation opening 20, so that a common ventilation opening 26 is in turn produced as a result when the retaining strap is released, as described in connection with FIGS. 3 to 8.

Figure 11:
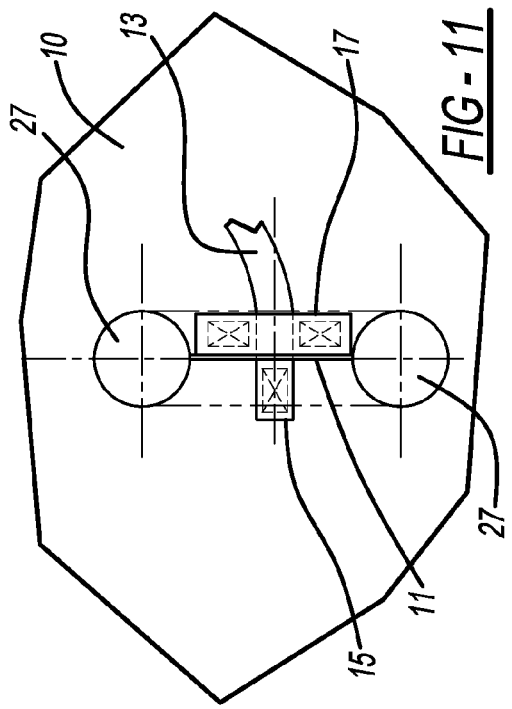
FIGS. 11-12 show the subject matter of FIGS. 9 to 10 with standard ventilation openings which are arranged on both sides of the adaptive ventilation opening, which is overlapped by the retaining strap, and are cut instead of the stop holes which are situated at the end of the slit.
Figure 12:
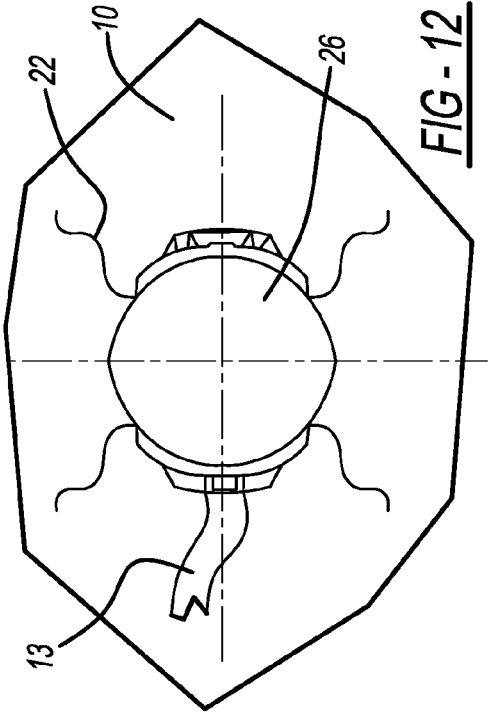

The exemplary embodiment reproduced in FIGS. 11 and 12 differs from the exemplary embodiment described in connection with FIGS. 9 and 10 only in that the stop holes are configured as standard ventilation openings 27 on both sides of the slit 11, analogously to the exemplary embodiment according to FIGS. 6 to 8.

Figure 13:
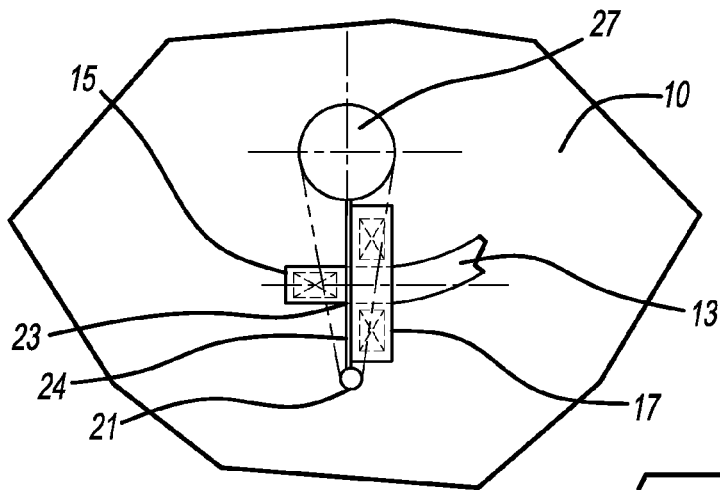
FIG. 13 shows a further embodiment with a slit region which forms an adaptive ventilation opening, a slit region which is adjacent thereto and forms a standard ventilation opening and a standard ventilation opening which is cut instead of a stop hole which is situated at the end of the slit, in the closed state.
Figure 14:
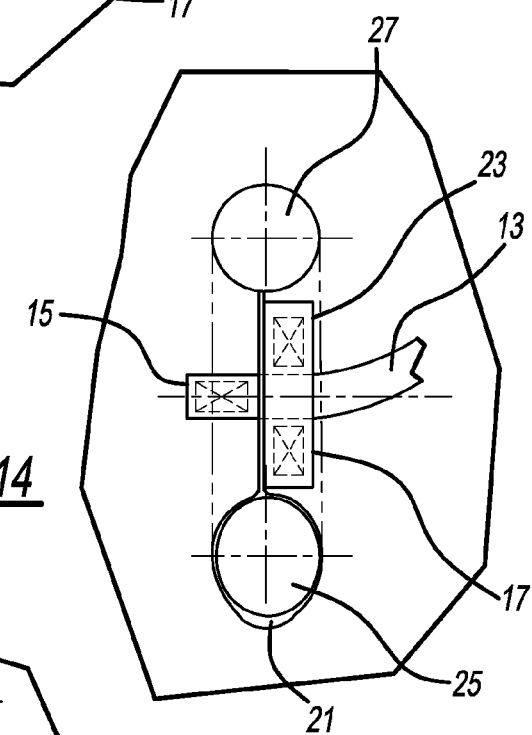
FIG. 14 shows the subject matter of FIG. 13 with open standard ventilation devices, but with the adaptive ventilation opening still closed.
Figure 15:
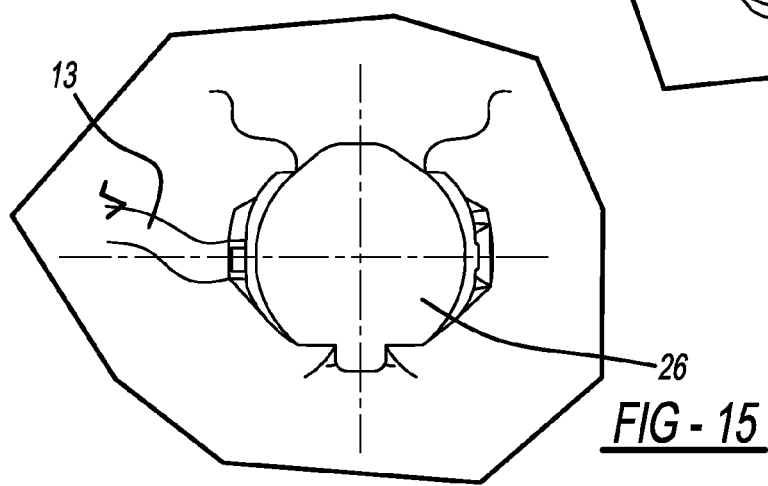
FIG. 15 shows the subject matter of FIG. 14 with the ventilation opening completely open.

The exemplary embodiment finally shown in FIGS. 13 to 15 shows a combination of the above-described exemplary embodiments with regard to the application of the standard ventilation opening, in which on one side a stop hole is configured from the start as a standard ventilation opening 27, whereas the slit 11 additionally has a slit region 24 for forming a standard ventilation opening under the effect of pressure. In this case, too, a common ventilation opening 26 is produced at the end in the described form when the retaining strap 13 is released.

The features of the subject matter of these documents which are disclosed in the above description, the patent claims, the abstract and the drawing can be essential for the implementation of the invention in its various embodiments individually and also in any combination with each other.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An airbag module for installation in a motor vehicle, comprising:
    an airbag formed from an airbag fabric;
    an inflation device for inflating the airbag;
    at least one slit (11) in the airbag fabric, the slit forming an adaptive ventilation opening which is at least partially closed when the airbag is folded;
    a retaining strap arranged inside the airbag and having a first end releasably connected to a retainer on a part fixed to the motor vehicle and a second end fixedly connected to the airbag, the retaining strap extending across the adaptive ventilation opening in such a manner that the retaining strap prevents the adaptive ventilation opening from opening when the retaining strap is stretched upon inflation of the airbag due to inflation pressure and that the retaining strap allows the adaptive ventilation opening to open when the retaining strap is not stretched upon inflation of the airbag; and a securing loop (17) attached to the airbag fabric opposite the second end (14) of the retaining strap with respect to the slit (11), the retaining strap being guided from the second end through the securing loop (17) toward the retainer, wherein the slit has two stop holes arranged at opposite ends of the slit, the two stop holes being configured as constantly open ventilation openings, the two stop holes merging into one combined enlarged ventilation opening under pressure when the retaining strap is not stretched upon inflation of the airbag.

2. The airbag module according to claim 1, wherein the retaining strap allows the stop holes to merge when retaining strap is released from the retainer.

3. The airbag module according to claim 1, further comprising that the securing loop (17) consists of a fabric strip (18) which is arranged transversely with respect to the direction in which the retaining strap (13) runs and has two outer ends fixedly connected to the airbag fabric.

4. The airbag module according to claim 1, further comprising that the retainer is attached to a part of the airbag module inside the airbag.

5. The airbag module according to claim 1, further comprising that the slit has a configuration to prevent tearing of the airbag fabric.

6. The airbag module according to claim 5, wherein the configuration comprises a seam closing at least a portion of the slit (11).

7. The airbag module according to claim 1, wherein the slit has a first slit section (23) and a second slit section (24), the first and second slit sections opening under the effect of pressure regardless of the retaining strap, the first slit section being located adjacent to one of the two stop holes and the second slit section being located adjacent to the other one of the two stop holes.

8. The airbag module according to claim 1, wherein the slit (11) is at least partially closed by a tear seam connecting fabric areas from both sides opposing each other along the slit (11).

* * * * *